United States Patent [19]
Beretta

[11] Patent Number: 5,851,089
[45] Date of Patent: Dec. 22, 1998

[54] COMPOSITE REINFORCED STRUCTURE INCLUDING AN INTEGRATED MULTI-LAYER GEOGRID AND METHOD OF CONSTRUCTING THE SAME

[75] Inventor: Mario Beretta, Sirtori LC, Italy

[73] Assignee: Tenax Spa, Vigano LC, Italy

[21] Appl. No.: 727,346

[22] Filed: Oct. 7, 1996

[51] Int. Cl.⁶ .......................... E02D 17/20; E01C 21/00; C09K 17/00
[52] U.S. Cl. .................. 405/259.1; 405/258; 405/262
[58] Field of Search ................... 405/258, 259.1, 405/262, 272, 284

[56] References Cited

U.S. PATENT DOCUMENTS

| | | | |
|---|---|---|---|
| 3,914,365 | 10/1975 | Kim et al. | 264/147 |
| 4,472,086 | 9/1984 | Leach | 405/258 |
| 4,590,029 | 5/1986 | Mercer | 264/156 |
| 4,662,946 | 5/1987 | Mercer | 106/281 R |
| 4,728,227 | 3/1988 | Wilson et al. | 405/284 |
| 4,743,486 | 5/1988 | Mercer et al. | 428/134 |
| 4,837,387 | 6/1989 | Van De Pol | 405/258 X |
| 4,992,003 | 2/1991 | Perach | 405/258 |
| 5,156,495 | 10/1992 | Mercer | 405/262 |
| 5,255,998 | 10/1993 | Beretta | 405/258 X |
| 5,267,816 | 12/1993 | Mercer et al. | 405/258 |
| 5,419,659 | 5/1995 | Mercer | 405/258 |

*Primary Examiner*—Tamara L. Graysay
*Assistant Examiner*—Tara L. Mayo
*Attorney, Agent, or Firm*—Venable, Baetjer, Howard & Civiletti, LLP

[57] ABSTRACT

This invention relates to a geogrid structure which is comprised of two or more layers of rigidly bonded flexible mesh structures. The mesh openings of each layer, without superimposing, overlay mesh openings of other layers, resulting in a geogrid structure which consists of small and large sized mesh openings. The smaller sized mesh openings are designed to reduce vertical migration of the smaller aggregate particles into the subgrade and to reduce pumping of the subgrade material into the aggregate layer. The rigid bonding of multiple layers of mesh structure provides a mechanism for transmission of tensile stress which is less dependent upon interlocking of aggregate particles. Furthermore, by bonding multiple layers of mesh structure, the number of tensile elements per unit area is increased, and as a result, the interaction of the geogrid with the fill material is enhanced. This increased interaction results in enhanced interlocking of aggregate particles and in increased frictional resistance of the geogrid structure for a variety of fill material. As a result, the geogrid structure of the present invention exhibits enhanced tensile stress transmission for a spectrum of high and low grade fill material.

50 Claims, 5 Drawing Sheets

COMPOSITE REINFORCED STRUCTURE INCLUDING AN INTEGRATED MULTI-LAYER GEOGRID AND METHOD OF CONSTRUCTING THE SAME

BACKGROUND OF THE INVENTION

This invention relates to a geogrid structure comprised of multiple layers of rigidly integrated flexible mesh structure which may be obtained, for example, by co-extrusion of a plastic material like polyethylene or polypropylene. The rigid integration of multiple layers eliminates tendency of layers to shift and rotate relative to one another. The mesh openings of each layer, without superimposing, overlay mesh openings of other layers, resulting in a geogrid structure which consists of varying in size mesh openings. In one embodiment of the invention, one layer may have mesh openings which are substantially smaller in size than the mesh openings of the other layer. The smaller sized mesh openings are designed to reduce vertical migration of the smaller particulate materials (e.g., aggregate particles) into the particulate material of the subgrade and to reduce pumping of the subgrade material into the aggregate layer without creating a plane of separation as is the case with the use of geotextiles. The rigid integration of multiple layers of mesh structure provides a mechanical means for transmission of tensile stress which is less dependent upon interlocking of aggregate particles. Furthermore, by integrating multiple layers of mesh structure, the number of tensile elements per unit area is increased, and each layer is kept in place with respect to the next layer resulting in an enhanced capability to interact with the soil. This increased interaction results in enhanced interlocking of aggregate particles and in increased frictional resistance of the geogrid structure for a variety of fill material. As a result, the geogrid structure of the present invention exhibits enhanced tensile stress transmission for a spectrum of high and low grade fill material.

The publications and other materials used herein to illuminate the background of the present invention, and in particular cases to provide additional details respecting its practice, are incorporated herein by reference.

In base reinforcement applications such as paved or unpaved roads and in construction over weak soil such as stabilization of embankments on soft soil, geogrids are used to provide reinforcement and confinement to base fill materials. The structural integrity of a reinforced structure is affected by the granularity and the resistance of the fill material to tensile stress. As a result, in selecting a particular geogrid for a reinforcement application, civil engineers often have to give proper attention to the quality of the fill material.

Although there are many different types of fill material used in reinforcement applications, all have extremely poor resistance to tensile stress. The lack of tensile strength under imposed dynamic loadings causes shear failure of the geogrid structure, resulting in severe rutting of the surface pavement. Furthermore, in construction applications over weak soils, practically anything, from granular to cohesive soils, is a potential fill material. This combination of poor quality fill material, which has a tendency to crack at relatively small tensile stress, creates endless problems, constantly challenging civil engineers.

In order to provide the requisite tensile strength, civil engineers use geogrids (see e.g., U. S. Pat. Nos. 5,267,816; 5,156,495; 4,728,227; 4,662,946) and geotextiles (see e.g., 4,992,003; 4,472,086) in base reinforcement and soft soil stabilization applications. Placing a geogrid or a geotextile between the aggregate and the subgrade improves the structural integrity of the pavement by distributing the tensile stress. When a geotextile is placed between the aggregate and the subgrade, the geotextile functions as a reinforcement layer and a separation layer. The separation layer, however, creates a discontinuity between the aggregate and the subgrade which produces a weak plane of restraint to tensile stress.

Uni-layer geogrids, on the other hand, exhibit greater tensile strength and provide a better stress transmission mechanism. The openings of the mesh structure in a uni-layer geogrid provide greater interaction with the aggregate which results in increased interlocking of aggregate particles. U.S. Pat. No. 5,419,659 describes a reinforced structure which is comprised of a flexible plastic material uni-layer geogrid embedded in a mass of soil. The uni-layer geogrid has oriented strands and transverse members with relatively large mesh openings. The uni-layer geogrid exhibits enhanced tensile strength and tensile stress transmission capability through interaction of the soil particles with the mesh openings.

The mesh openings in uni-layer geogrids, however, have an undesirable property which allows vertical movement of particles from the aggregate layer into the subgrade layer. Such migration of aggregate particles into the subgrade can take place after repetitive traffic loadings which would cause rutting of the surface pavement. In a single layer geogrid, the mesh openings also allow pumping of the fill material from the subgrade into the aggregate layer which reduces the interaction of the geogrid with the aggregate particles. Vertical migration of aggregate particles into the subgrade and pumping of the subgrade material into the aggregate are particularly present in reinforcement applications where the fill material consists of small sized aggregate particles or cohesive subgrade material.

In order to reduce the extent of vertical migration of aggregate particles into the subgrade, civil engineers overlay multiple layers of geogrids in base reinforcement and soft soil stabilization applications. Typically, multiple layers of mesh structure are overlaid and stitched together without superimposing the mesh openings. The multiple layers create a geogrid with random sized apertures designed to accommodate small sized as well as large sized aggregate particles. The random sized apertures increase the interaction of the geogrid with the fill material which in turn reduces vertical intrusion of the aggregate particles into the subgrade and pumping of the subgrade material into the aggregate layer. The multiple layers also provide a three dimensional separation effect between the aggregate and the subgrade which further reduces migration of fill material. If the fill material gets by one layer of the geogrid, the other layers are there to prevent further migration. In practice, the multiple layers act as a three dimensional active resistance which traps the aggregate particles, preventing them from going through the mesh openings. As a result, the multi-layer "stitched" geogrid has the advantages of a geotextile and a uni-layer geogrid without having their disadvantages.

In the multi-layer "integrated" geogrid structure of the present invention, each layer is rigidly bonded at discrete points with the other layers. The rigid bonding of the layers reduces stretching of the layers while at the same time prevents separation of the layers from each other. Increased performances are also found in the pull-out and shear-box testing which shows enhanced mechanical and interlocking properties compared to other existing geogrids. Furthermore, the geogrid structure of the present invention exhibits better performance in the long term for the same grade quality of aggregate fill material than any other existing geogrid.

SUMMARY OF THE INVENTION

The object of this invention is to create a flexible multi-layer integrated geogrid, with an enhanced mechanism for transmission of tensile stress, which is to be used with a spectrum of high and low grade fill material in base reinforcement and soft soil stabilization applications.

It is a specific object of this invention to create a flexible multi-layer integrated geogrid with an enhanced tensile stress mechanism which is achieved through mechanical connection points of multiple layers of mesh structure. Thus, the resulting geogrid exhibits enhanced tensile stress transmission properties with less dependency on the quality of the aggregate particles when used in base reinforcement applications.

It is a further object of this invention to create a flexible multi-layer integrated geogrid that reduces vertical migration of the aggregate layer into the subgrade and reduces pumping of the subgrade into the aggregate layer.

It is a further object of this invention to create a flexible multi-layer integrated geogrid by extruding multiple layers of rigidly integrated mesh structure as a single unit which exhibits dimensional stability. The rigid integration of multiple layers of mesh structure eliminates tendency of layers to shift and rotate relative to one another.

It is a further object of this invention to create a flexible multi-layer integrated geogrid with a greater number of tensile elements per unit area created by rigidly bonding multiple layers of tensile elements forming a three dimensional structure, and thus, increasing the interaction of the geogrid with the fill material. This increased interaction enhances the interlocking of aggregate particles, the passive resistance of the geogrid and the frictional resistance on the geogrid surface which result in an enhanced tensile stress transmission mechanism. As a result, applied loads are distributed throughout a wider area, preventing rutting of the surface pavement.

It is a further object of this invention to create a flexible multi-layer integrated geogrid with varied mesh openings to increase interaction and compatibility with fill material consisting of random sized particles. The smaller sized mesh openings provide enhanced interlocking of smaller sized fill material and the larger sized mesh openings provide interlocking of larger sized fill material. This enhanced interlocking of the fill material particles increases tensile stress transmission by distributing tensile stress to large as well as small sized fill particles.

It is an object of this invention to create a flexible geogrid, comprised of multiple layers of rigidly integrated mesh structure, through a reliable and an economical manufacturing process.

DETAILED DESCRIPTION OF THE PREFERRED EMBODIMENTS

BIAXIALLY STRETCHED STRUCTURE

Figure 1:
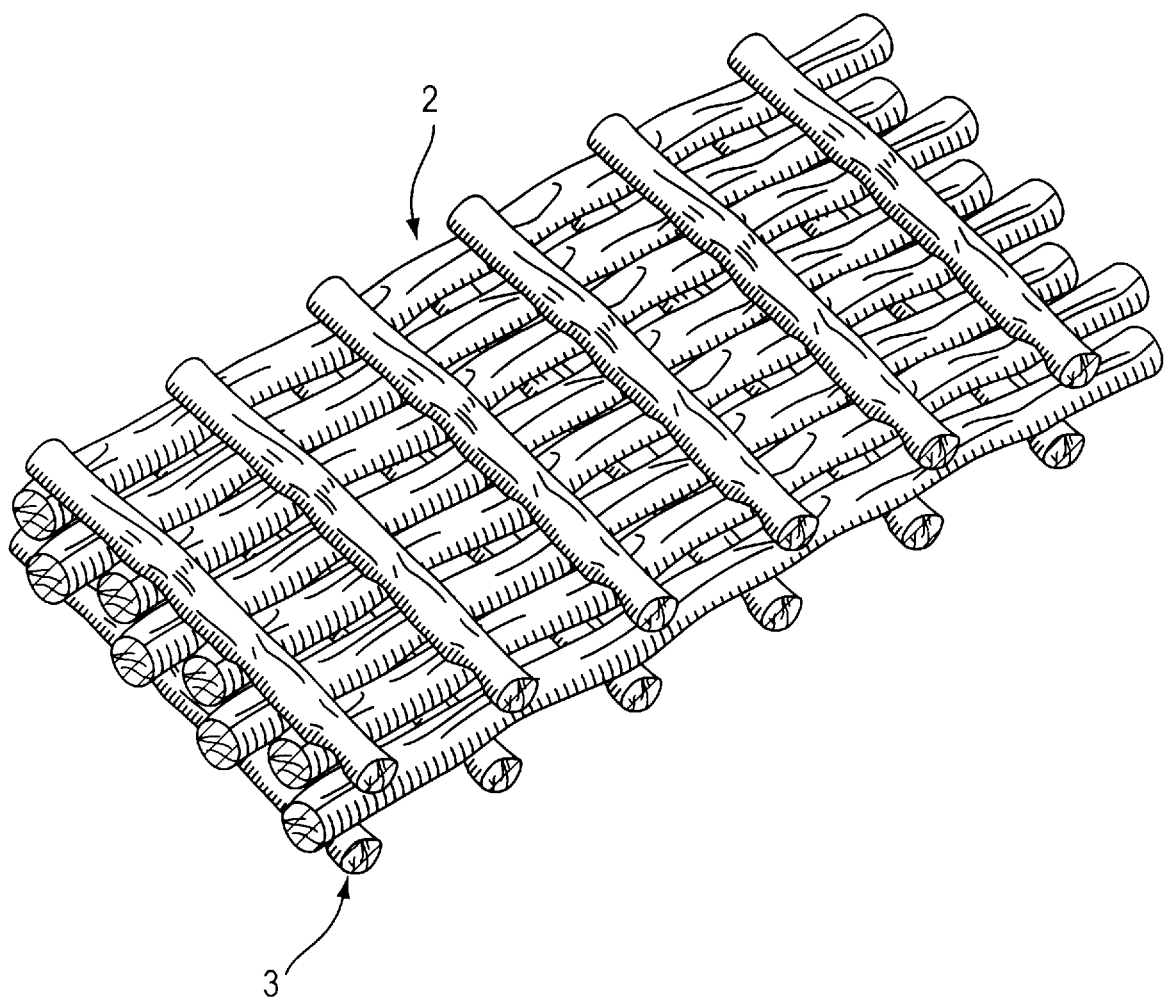
FIG. 1 is a schematic perspective view of a flexible multi-layer mesh structure that is not stretched.
Figure 2:
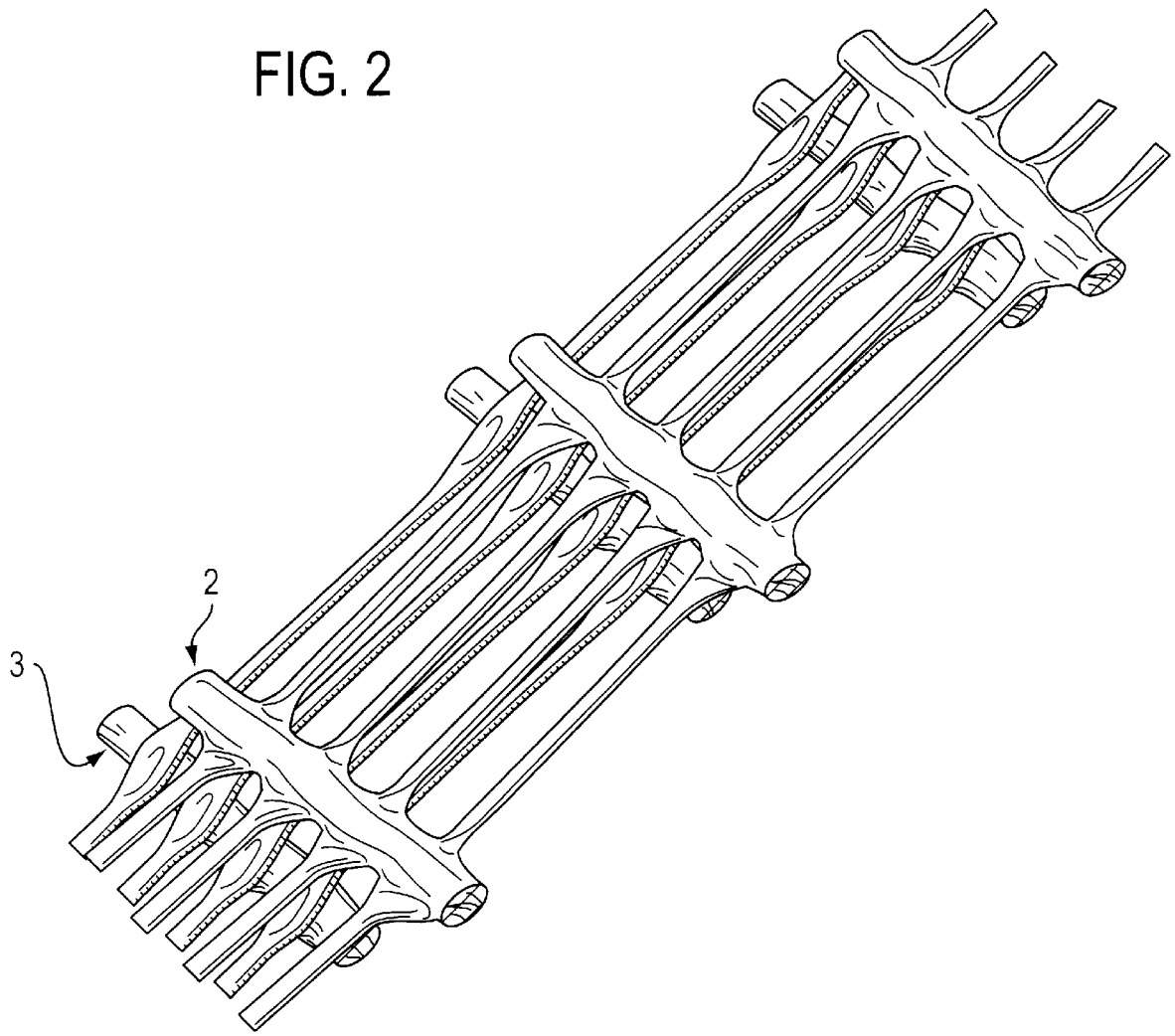
FIG. 2 is a view of a flexible multi-layer mesh structure stretched along a single direction.
Figure 3:
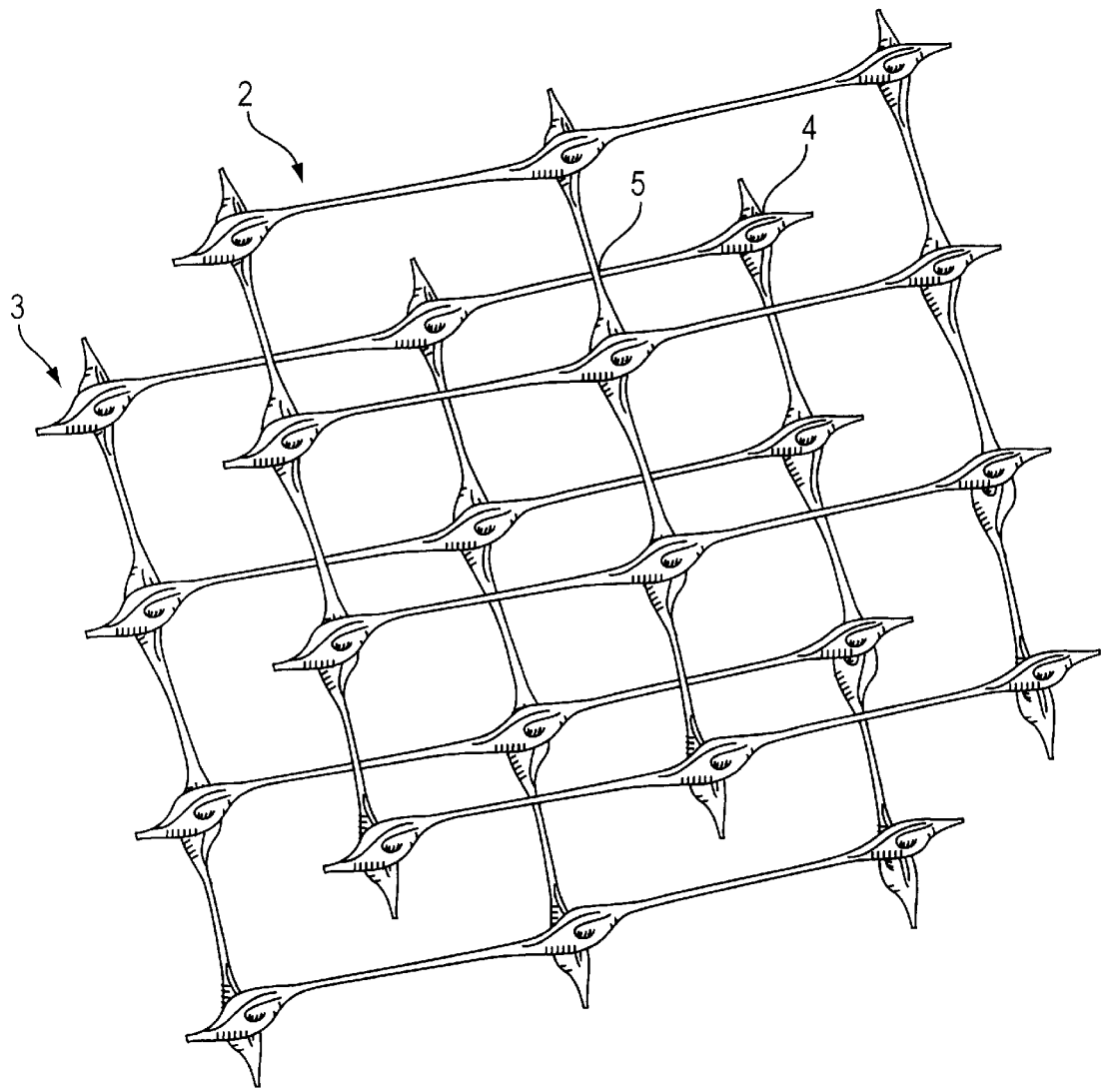
FIG. 3 is a schematic perspective view of a flexible multi-layer mesh structure stretched along two mutually orthogonal directions.

FIG. 3 is a schematic representation of the preferred structure of a geogrid for use in base reinforcement and soil stabilization applications. The multi-layer flexible geogrid depicted in FIG. 3 is created through an extrusion process. Polymer resins, colorants and ultra-violet stabilizers are mixed in a heated chamber. The resulting polymer mixture is extruded through counter rotating dieheads, producing a multi-layer mesh structure where strands of each layer are thermally bonded at discrete points along strands of the other layer in the machine direction. The resulting multi-layer mesh structure is depicted in FIG. 1. This extruded multi-layer mesh structure is then stretched in both the machine and the transverse directions. FIG. 2 depicts a multi-layer mesh structure stretched only in the machine direction. FIG. 3 depicts a multi-layer mesh structure stretched in both the machine and the transverse direction. As depicted in FIG. 3, the preferred embodiment is comprised of a biaxially stretched first layer 2 mesh structure which is rigidly bonded at discrete points 5 to a biaxially stretched second layer 3 mesh structure. The first layer 2 is comprised of square mesh openings which are constituted by overlapping strands, forming a bi-planar mesh structure. The mesh openings are defined by overlapping of substantially parallel oriented strands in the machine direction with substantially parallel oriented strands in the transverse direction. As illustrated in FIG. 3, at the point where an oriented strand in the machine direction overlaps an oriented strand in the transverse direction, a bi-planar junction 4 is formed. The sides of the junction 4 are curved and gradually merge with each oriented strand. The width of the mid point of each strand can range from 0.5 mm to 5 mm, preferably, 1.0 mm to 3.0 mm. The thickness of the mid point of each strand can range from 0.5 mm to 7 mm, preferably 1.0 mm to 4.0 mm. The length of each strand between two overlapping points can range from 15 mm to 200 mm, preferably 15 mm to 90 mm. For the most preferred embodiment, the mid point of each strand is 1.5 mm in width and 2.0 mm in thickness, and the length of each strand between two overlapping points is 35 mm.

The second layer 3 is also comprised of square mesh openings which are constituted by overlapping strands, forming a biplanar mesh structure. The mesh openings are defined by overlapping of substantially parallel oriented strands in the machine direction with substantially parallel oriented strands in the transverse direction. As illustrated in FIG. 3, at the point where an oriented strand in the machine direction overlaps an oriented strand in the transverse direction, a bi-planar junction 4 is formed. The sides of the junction 4 are curved and gradually merge with each oriented strand. The width of the mid point of each strand can range from 0.5 mm to 5 mm, preferably, 1.0 mm to 3.0 mm. The thickness of the mid point of each strand can range from 0.5 mm to 7 mm, preferably 1.0 mm to 4.0 mm. The length of each strand between two overlapping points can range from 15 mm to 200 mm, preferably 15 mm to 90 mm. For the most preferred embodiment, the mid point of each strand is 1.0 mm in width and 1.5 mm in thickness, and the length of each transverse strand between two overlapping points is 12 mm.

The overall stretch-ratio in the machine direction and in the transverse direction for a biaxially stretched multi-layer geogrid is from 3 to 8, preferably 3 to 6.5.

The mesh openings of the first layer 2 randomly overlay mesh openings of the second layer 3, forming random sized apertures. Each mesh opening of the first layer 2 completely overlay one or more mesh openings of the second layer 3. Each mesh opening of the first layer 2 also overlay portions of one or more mesh openings of the second layer 3. As a result, adjacent mesh openings of the first layer 2 overlay mutually exclusive areas of the same mesh openings in the second layer 3.

Although the shape of the mesh openings depicted in FIG. 3 is square, the mesh openings can be of any shape. The shape of the mesh openings is not a distinguishing feature of this invention. The distinguishing feature of this invention is the rigid bonding of the first layer 2 with the second layer 3. The two layers of mesh structure are preferably bonded at discrete points 5 along the strands of the first layer 2 in both the machine direction and the transverse direction. Because the two layers of mesh structure are rigidly bonded to each other, the resulting geogrid exhibits enhanced performance through bi-planar bondings which allow for a three dimensional interlocking of the geogrid with the aggregate.

The bonding of the two layers of mesh structure provide a greater number of tensile elements per unit area. A greater number of tensile elements increases the interaction of the geogrid with the fill material which enhances the frictional resistance of the upper surface of the geogrid with respect to the aggregate particles. Similarly, a greater number of tensile elements also increases the number of mesh openings per unit area which in turn enhances the interlocking of aggregate particles.

In another embodiment of the present invention, the mesh sizes of the two layers may be different in dimensions. The relative difference in the size of mesh openings between the first layer 2 and the second layer 3 greatly increases the interaction and compatibility of the geogrid with the fill material which consists of random sized particles. The smaller sized mesh openings of the second layer 3 provide enhanced interlocking of smaller sized fill material and the larger sized mesh openings of the first layer 2 provide interlocking of larger sized fill material. This increased interlocking enhances tensile stress transmission by distributing tensile stress to large and small sized fill particles.

The smaller sized mesh openings of the second layer 3 significantly reduce vertical migration of the smaller particles in the aggregate layer into the subgrade. These smaller mesh openings also significantly reduce pumping of the subgrade into the aggregate layer by acting as a separation layer between the aggregate layer and the subgrade. As a result of this separation layer, there is an increased interaction between the first layer 2 and the aggregate particles which results in increased interlocking of aggregate particles. Because the aggregate layer is comprised of granular particles which have substantially stronger tensile strength properties than the subgrade layer which is typically comprised of highly cohesive material such as clay, by minimizing the pumping of the subgrade into the aggregate layer, the tensile strength and tensile transmission properties of a reinforced structure is enhanced.

The biaxially stretched multi-layer mesh structure of this invention provides a mechanical means and an interlocking means for transmission of tensile stress between the first layer 2 and the second layer 3. The rigid bonding of the first layer 2 with the second layer 3 provides discrete mechanical connection points for transmission of tensile stress from one layer to another. As a result of this additional mechanical means, the biaxially stretched multi-layer mesh structure appears to be less dependent on the interlocking of aggregate particles for transmission of tensile stress, resulting in enhanced mechanical properties when compared to other existing geogrids for use in base reinforcement and soil stabilization applications. One enhanced mechanical property is illustrated by the difference in the pull-out properties of the present invention and that of a uni-layer geogrid. As a result, in designing reinforced structures, civil engineers will have much more latitude in selecting a particular fill material in order to achieve the same level of tensile stress transmission.

UNIAXIALLY STRETCHED STRUCTURE

FIG. 2 is a schematic representation of a uniaxially stretched multi-layer mesh structure. The second embodiment is comprised of a uniaxially stretched first layer 2 mesh structure which is rigidly integrated with a uniaxially stretched second layer 3 mesh structure. In the embodiment of FIG. 2, the first layer 2 is comprised of mesh openings which are constituted by overlapping strands, forming a biplanar structure. The mesh openings are defined by overlapping of substantially parallel oriented strands in the machine direction with substantially parallel strands in the transverse direction. The width of the mid point of each oriented strand in the machine direction can range from 0.5 mm to 10 mm, preferably 1.5 mm to 8 mm. The thickness of the mid point of each oriented strand in the machine direction can range from 0.5 mm to 10 mm, preferably 1.5 mm to 8 mm. The length of each oriented strand in the machine direction between two overlapping points can range from 10 mm to 300 mm. preferably 30 mm to 200 mm. The width of the mid point of each strand in the transverse direction can range from 0.7 mm to 25 mm, preferably 1 mm to 20 mm. The thickness of the mid point of each strand in the transverse direction can range from 0.7 mm to 20 mm, preferably 1 mm to 15 mm. The length of each strand in the transverse direction between two overlapping points can range from 5 mm to 150 mm, preferably 10 mm to 80 mm. For the most preferred embodiment, the mid point of each oriented strand in the machine direction is 1.5 mm in width and 2.0 mm in thickness, and the length of each oriented strand in the machine direction between two overlapping points is 35 mm. The mid point of each strand in the transverse direction is 2.0 mm in width and 3.0 mm in thickness, and the length of each strand in the transverse direction between two overlapping points is 10 mm.

The second layer 3 is also comprised of mesh openings which in this particular embodiment are constituted by overlapping strands, forming a biplanar structure. The mesh openings arc defined by overlapping of substantially parallel oriented strands in the machine direction with substantially parallel strands in the transverse direction. The width of the mid point of each oriented strand in the machine direction can range from 0.5 mm to 10 mm, preferably 1.5 mm to 8 mm. The thickness of the mid point of each oriented strand in the machine direction can range from 0.5 mm to 10 mm, preferably 1.5 mm to 8 mm. The length of each oriented strand in the machine direction between two overlapping points can range from 10 mm to 300 mm, preferably 30 mm to 200 mm. The width of the mid point of each strand in the transverse direction can range from 0.7 mm to 15 mm, preferably 1 mm to 10 mm. The thickness of the mid point of each strand in the transverse direction can range from 0.7 mm to 20 mm, preferably 1 mm to 15 mm. The length of each strand in the transverse direction between two overlapping points can range from 5 mm to 150 mm, preferably 10 mm to 80 mm. For the most preferred embodiment the mid point of each oriented strand in the machine direction is 1.0 mm in width and 1.5 mm in thickness, and the length of each oriented strand in the machine direction between two overlapping points is 12 mm. The mid point of each strand in the transverse direction is 1.5 mm in width and 2.5 mm in thickness, and the length of each oriented strand in the transverse direction between two overlapping points is 4 mm. The stretching ratio in the machine direction to the transverse direction for a uniaxially stretched multi-layer geogrid is 3 to 10, preferably 3 to 8.

The mesh openings of the first layer 2 are generally offset to the mesh openings of the second layer 3, and thus, forming random sized apertures. This is particularly true when the dimensions of the mesh openings for the first layer 2 are different than the second layer 3. Each mesh opening of the first layer 2 completely overlay one or more mesh openings of the second layer. Each mesh opening also overlay portions of one or more mesh openings of the second layer 3. As a result, adjacent mesh openings of the first layer 2 overlay mutually exclusive areas of the same mesh opening in the second layer 3.

In this embodiment, the shape of the mesh openings in the first layer 2 and the second layer 3 are rectangular. Like the preferred embodiment, the two layers of mesh structure are thermally bonded at discrete points along the strands of the first layer 2 in the machine direction. The two layers of mesh structure may also be bonded at discrete points along the strands of the first layer 2 in the transverse direction. Because the two layers of mesh structure are rigidly bonded to each other the resulting geogrid provides a three dimensional interlocking between the geogrid and the soil particles. The rigid bonding of the first layer 2 to the second layer 3 allows for a rigid, yet flexible, connection between the two layers.

In addition, the difference in the size of mesh openings between the first layer 2 and the second layer 3 increases the interaction and compatibility of the geogrid with the fill material which consists of random sized particles. The smaller sized mesh openings of the second layer 3 provide enhanced interlocking of smaller sized fill material when such material are present while the larger sized mesh openings of the first layer 2 provide interlocking of larger sized fill material. This increased interlocking enhances tensile stress transmission by distributing tensile stress to large and small sized fill particles. The rigid bonding between the strands of the two layers allows for the overall structure to work as a three dimensional reinforcing network.

The smaller sized mesh openings of the second layer 3 significantly reduce vertical migration of aggregate layer into the subgrade. These smaller mesh openings also significantly reduce pumping of the cohesive subgrade into the aggregate layer by acting as a separation layer between the aggregate layer and the subgrade. As a result of this separation effect, there is an increased interaction between the first layer 2 and the aggregate particles which results in increased interlocking of aggregate particles. Because the aggregate layer is comprised of granular particles which have substantially stronger tensile strength properties than the subgrade layer which is typically comprised of highly cohesive material such as clay, by minimizing the pumping of the subgrade into the aggregate layer, the tensile strength and tensile transmission properties of a reinforced structure is enhanced. The uniaxially stretched multi-layer mesh structure of this invention provides a mechanical means and an interlocking means for transmission of tensile stress between the first layer 2 and the second layer 3. The rigid integration of the first layer 2 with the second layer 3 provides discrete connection points (i.e. a mechanical means) for transmission of tensile stress from one layer to another. As a result of this additional mechanical means, the uniaxially stretched multi-layer mesh structure is less dependent on the interlocking of aggregate particles for transmission of tensile stress.

USES IN CIVIL ENGINEERING

The present invention can be used in the civil engineering applications described in U.S. Pat. Nos. 4,590,029; 4,743,486; 5,267,816; 4,728,227; 3,914,365; 4,992,003; 5,156,495; and, 5,419,659. Structures generally in accordance with the present invention can be used for base reinforcement of paved and unpaved roads, retaining or stabilizing fill material of any suitable form, such as soil, earth, sand, clay or gravel, and in any suitable location, such as on the side of a cutting or embankment, beneath a road surface, runway surface or railway track, beneath a building or beneath a quay. It is considered that the structure can be specially suitable for preventing retaining walls being forced out of position by the pressure of fill material behind them.

Figure 4:
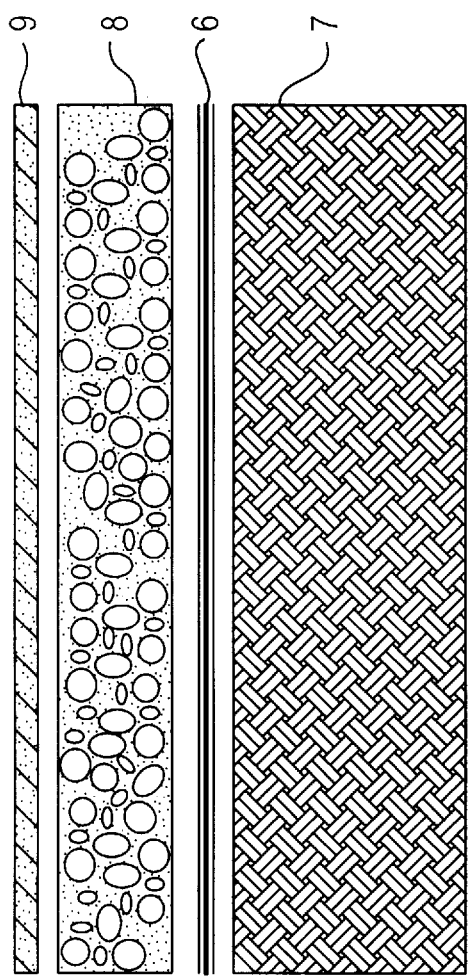
FIG. 4 is a cross sectional view of a multi-layer flexible mesh structure embedded between an aggregate layer and a subgrade layer.

The preferred embodiment for base reinforcement or soft soil stabilization is a biaxially stretched multi-layer integrated geogrid, though a uniaxially stretched geogrid could be used. The multi-layer mesh structure will normally be placed roughly parallel to the surface of the fill material, e.g. horizontally below a roadway or inclined if near an embankment or cutting surface. Specifically, as shown in FIG. 4, in a reinforced highway base, a multi-layer integrated geogrid 6 is placed horizontally between the subgrade layer 7 and the aggregate layer 8 such that its upper face is in direct contact with the aggregate particles and its lower face is in direct contact with the subgrade. Furthermore, an asphalt layer 9 is overlayed the aggregate layer 8. In this embodiment, the multi-layer mesh structure is preferably substantially rectilinear in section normal to its "plane", at least in the section taken parallel to the orientated strands which will normally be parallel to the line of expected tension on the mesh structure. This enables the tensile strength of the mesh structure to be fully exploited.

As an illustration, a highway base reinforced with a multi-layer integrated geogrid 6, which has a first layer 2 with a mesh opening of about 30 mm by 400 mm and a second layer 3 with a mesh opening of 5 mm by 5 mm, would have an overall tensile strength of 15 by 15 kilo Newton/meter at 12% strain and a tensile modulus of 150 kilo Newton/meter. The subgrade layer 7 would be a fine saturated sandy soil which has low mechanical properties. The estimated subgrade shear strength in terms of California Bearing Ratio (CBR) would be 3.00%. The aggregate layer 8 would be a well graded crushed stone having the following characteristics: less than 80% will pass through a 10 mm sieve, less than 50% will pass through a 4 mm sieve, less than 20% will pass through a 1 mm sieve, and less than 5% will pass through a 0.063 mm sieve.

An unreinforced highway designed for a 1,000,000 Equivalent Axis Load would require an asphalt layer 9 and aggregate layer 8 with a thickness of 100 mm and 410 mm respectively. To achieve the same performance, a reinforced highway base which uses the above mentioned multi-layer integrated geogrid would require an asphalt layer 9 and an aggregate layer 8 with a thickness of 100 mm and 250 mm respectively. As a result, the use of the multi-layer integrated geogrid would yield a considerable savings in the amount of aggregate layer 8 thickness required in order to achieve a given structural integrity.

The multi-layer mesh structure can have practical utility without specific fixed retention, but it may be fixed to at least one substantially rigid member. The substantially rigid member is preferably made of a cast material into which the mesh structure has been incorporated before acting, a suitable material being concrete, but alternatively the multi-layer mesh structure could be fixed in other ways to one or more pre-cast members or to one or more steel plates. The member along one edge of the multi-layer mesh structure could be a retaining wall.

Figure 5:
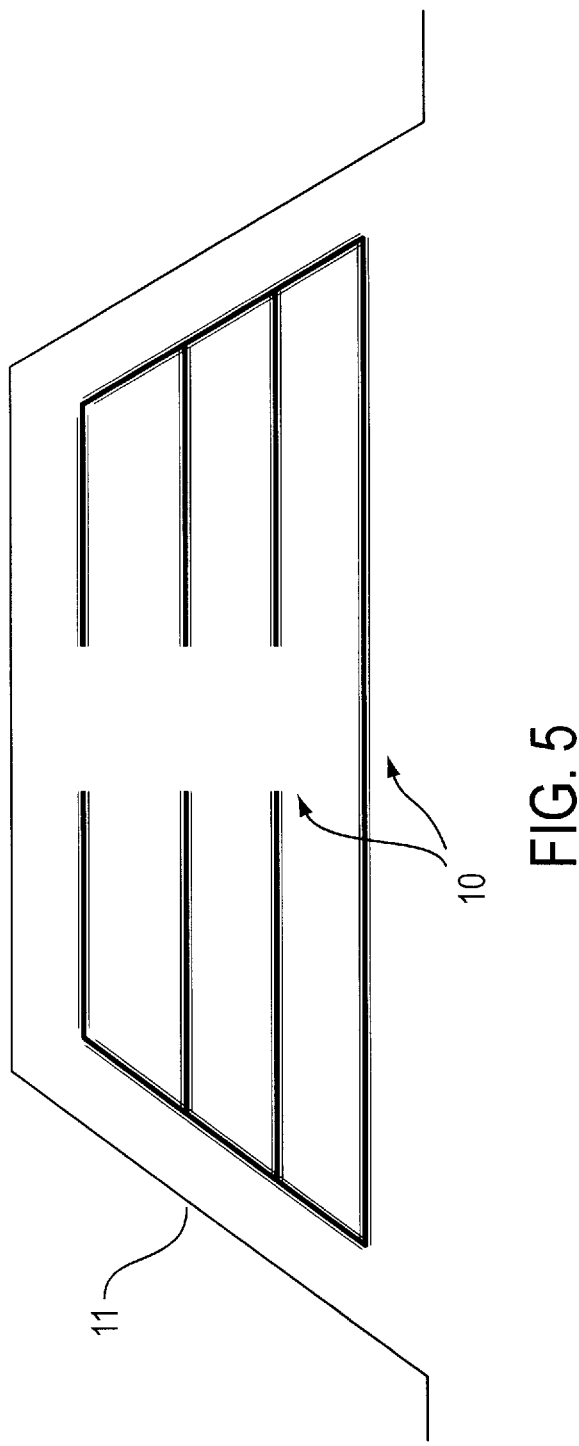
FIG. 5 is a vertical section through an embankment stabilized in accordance with the invention.

In FIG. 5, spaced layers of a uniaxially stretched structure 10, as described for instance with reference to FIG. 2, are buried in an earth embankment 11. The earth embankment 11 extends form one sloping face to another sloping face, and is made by placing on the ground a horizontal first layer of the structure 10, placing a first layer of earth on the first layer of structure 10 while leaving the end portions of the structure 10 protruding from each face, to thereby embed the first layer in the earth and apply to the first layer of structure 10 a continuous load in the direction of the strands and increase the strength of the earth around the first layer, bringing said end portions up the faces and laying the end most parts thereof on top of the first layer of earth and then placing a second layer of structure 10 on the first layer of earth. As mentioned above, a biaxially stretched multi-layer mesh structure could be used instead of a uniaxially stretched structured.

It will be appreciated that the methods and structures of the present invention can be incorporated in the form of a variety of embodiments, only a few of which are described herein. It will be apparent to the artisan that other embodiments exist and do not depart from the spirit of the invention. Thus, the described embodiments are illustrative and should not be construed as restrictive.

What is claimed is:

1. A composite reinforced structure, comprising:

a mass of particulate material; and a geogrid, said geogrid having an upper surface and a lower surface and comprising a plurality of layers of mesh structure, wherein each said layer is rigidly bonded to contiguous ones of the other layers of mesh structure at discrete points along each said layer in at least one direction, each said layer of mesh structure comprising substantially parallel oriented strands interconnected by substantially parallel transverse strands, said oriented strands and said transverse strands defining therebetween a plurality of mesh openings, each said layer having its respective mesh openings overlaying one or more mesh openings of the other layers;

wherein said geogrid is embedded in said mass of particulate material, such that a first portion of said mass of particulate material is above said geogrid, a second portion of said mass of particulate material is below said geogrid, and a third portion of said mass of particulate material is contained within said plurality of mesh openings defined by said geogrid, so that said mass of particulate material is in direct contact with said upper and lower surfaces of said geogrid and with portions of said geogrid defining said plurality of mesh openings;

whereby said geogrid distributes tensile stress to all of said portions of said mass of particulate material.

2. The composite reinforced structure of claim 1, wherein said mass of particulate material comprises:

an aggregate layer and a subgrade layer, said aggregate layer overlaying said subgrade layer;

wherein said geogrid is embedded between said aggregate layer and said subgrade layer, a first part of said aggregate layer is situated above said geogrid, a second part of said aggregate layer is contained within said plurality of mesh openings defined by said geogrid, so that said first and second parts of said aggregate layer are in direct contact with said upper surface of said geogrid and some of said plurality of mesh openings, and a part of said subgrade layer is in direct contact with said lower surface of said geogrid and others of said plurality of mesh openings;

whereby said composite structure distributes tensile stress to said first and second parts of said aggregate layer and said part of said subgrade layer.

3. The composite structure of claim 2, wherein the transverse strands are oriented.

4. The composite reinforced structure of claim 2 wherein said layer of aggregate is comprised of substantial small sized particles.

5. The composite reinforced structure of claim 2, wherein said layer of subgrade is comprised of soil.

6. The composite reinforced structure of claim 2, wherein more than one, generally horizontally extending, layers of said geogrid are embedded in said mass of particulate material in a vertically spaced relationship to each other.

7. The composite reinforced structure of claim 6, further comprising a face which extends generally at an angle to the horizontal with said mass of particulate material, wherein said geogrid is embedded within said mass of particulate material such that a main part of said geogrid extends generally horizontally to form one of said layers of said geogrid, and a further part of which, at about said face, extends horizontally as a next layer of said geogrid.

8. The composite reinforced structure of claim 7, wherein each said geogrid further comprises an end part, and each said geogrid is embedded in a mass of particulate material with said end part extending generally horizontally in spaced relationship to said main part and in juxtaposition to said next layer of said geogrid.

9. The composite structure of claim 1, wherein the transverse strands are oriented.

10. The composite reinforced structure of claim 1, wherein the mesh opening size of each layer is different from the mesh opening sizes of other layers.

11. The composite reinforced structure of claim 1, wherein the mesh opening size of each layer is different from the mesh opening sizes of all other layers.

12. The composite reinforced structure of claim 1, wherein the mesh opening size of each layer is substantially different from the mesh opening sizes of other layers.

13. The composite reinforced structure of claim 1, wherein the mesh opening size of each layer is substantially different from the mesh opening sizes of all other layers.

14. The composite reinforced structure of claim 1, wherein the strands of each layer have a cross sectional area that is different from the cross sectional area of the strands of other layers.

15. The composite reinforced structure of claim 1, wherein the strands of each layer have a cross sectional area that is different from the cross sectional area of the strands of all other layers.

16. The composite reinforced structure of claim 1, wherein the strands of each layer have a cross sectional area that is substantially different from the cross sectional area of the strands of other layers.

17. The composite reinforced structure of claim 1, wherein the strands of each layer have a cross sectional area that is substantially different from the cross sectional area of the strands of all other layers.

18. The composite reinforced structure of claim 1, wherein the mesh openings of each layer overlay portions of one or more mesh openings of the other layers.

19. The composite reinforced structure of claim 1, wherein the mesh openings of each layer overlay one or more whole mesh openings of the other layers.

20. The composite reinforced structure of claim 1, wherein said geogrid is not subjected to any substantial restraint other than that provided by said mass of particulate material.

21. The composite reinforced structure of claim 1, wherein said mass of particulate material and geogrid together define a reinforced embankment and each layer of mesh structure is uniaxially oriented.

22. The composite reinforced structure of claim 1, wherein said mass of particulate material and geogrid together define a reinforced embankment and each layer of mesh structure is biaxially oriented.

23. The composite reinforced structure of claim 1, wherein more than one, generally horizontally extending, layers of said geogrid are embedded in said mass of particulate material in a vertically spaced relationship to each other.

24. The composite reinforced structure of claim 23, further comprising a face which extends generally at an angle to the horizontal with said mass of particulate material, wherein said geogrid is embedded within said mass of particulate material such that a main part of said geogrid extends generally horizontally to form one of said layers of said geogrid, and a further part of which, at about said face, extends horizontally as a next layer of said geogrid.

25. The composite reinforced structure of claim 24, wherein each said geogrid further comprises an end part, and each said geogrid is embedded in a mass of particulate material with said end part extending generally horizontally in spaced relationship to said main part and in juxtaposition to said next layer of said geogrid.

26. A method of constructing a composite reinforced structure, comprising:
    providing a mass of particulate material;
    providing a geogrid, said geogrid having an upper surface and an lower surface and comprising at least two layers of mesh structure extruded as a single unit, wherein each layer is rigidly bonded to a contiguous layer at discrete points therealong in at least one direction, each layer of mesh structure comprising substantially parallel oriented strands, said oriented strands interconnected by substantially parallel transverse strands, said oriented strands and said transverse strands defining therebetween a plurality of mesh openings, each layer having its respective mesh openings overlaying one or more mesh openings of the other layers; and
    embedding said geogrid in said mass of particulate material, such that a first portion of said mass of particulate material is above said geogrid, a second portion of said mass of particulate material is below said geogrid, and a third portion of said mass of particulate material is contained within said plurality of mesh openings defined by said geogrid, so that said mass of particulate material is in direct contact with said upper and lower surfaces of said geogrid and with portions of said geogrid defining said plurality of mesh openings;
    whereby said geogrid distributes tensile stress to all of said portions of said mass of particulate material.

27. The method of claim 26, wherein said mass of particulate material comprises an aggregate layer and a subgrade layer, said aggregate layer overlaying said subgrade layer, further comprising the steps of:
    embedding said geogrid between said aggregate layer and said subgrade layer;
    extending a first portion of said aggregate layer above said geogrid;
    contacting a second portion of said aggregate layer within said mesh openings defined by said geogrid, so that one part of said second portion of said aggregate layer is in direct contact with said upper surface of said geogrid and another part of said second portion of said aggregate layer is in direct contact with said mesh openings; and
    contacting a portion of said subgrade within said mesh openings defined by said geogrid, so that one part of said portion of said subgrade is in direct contact with said lower surface of said geogrid and another part of said portion of said subgrade is in direct contact with said mesh openings;
    whereby said composite structure effectively reduces migration of said aggregate layer into said subgrade layer and said composite structure effectively reduces pumping of said subgrade layer into said aggregate layer.

28. The method of claim 27, wherein the transverse strands are oriented.

29. The method of claim 27, wherein said layer of aggregate is comprised of substantial small sized particles.

30. The method of claim 27, wherein said layer of subgrade is comprised of soil.

31. The method of claim 27, further comprising the step of embedding more than one, generally horizontally extending, layers of said geogrid in said mass of particulate material in a vertically spaced relationship to each other.

32. The method of claim 31, further comprising a face which extends generally at an angle to the horizontal with said mass of particulate material, wherein each said geogrid is embedded within said mass of particulate material such that a main part of each said geogrid extends generally horizontally to form one of said layers of said geogrid, and a further part of which, at about said face, extends horizontally as a next layer of said geogrid.

33. The method of claim 32, further comprising the steps of providing each said geogrid with an end part, and embedding each said geogrid in a mass of particulate material with said end part extending generally horizontally in spaced relationship to said main part and in juxtaposition to said next layer of said geogrid.

34. The method of claim 26, wherein the transverse strands are oriented.

35. The method of claim 26, wherein the mesh opening size of each layer is different from the mesh opening sizes of other layers.

36. The method of claim 26, wherein the mesh opening size of each layer is substantially different from the mesh opening sizes of other layers.

37. The method of claim 26, wherein the mesh opening size of each layer is different from the mesh opening sizes of all other layers.

38. The method of claim 26, wherein the mesh opening size of each layer is substantially different from the mesh opening sizes of all other layers.

39. The method of claim 26, wherein the strands of each layer have a cross sectional area that is different from the cross sectional area of the strands of other layers.

40. The method of claim 26, wherein the strands of each layer have a cross sectional area that is different from the cross sectional area of the strands of all other layers.

41. The method of claim 26, wherein the strands of each layer have a cross sectional area that is substantially different from the cross sectional area of the strands of other layers.

42. The method of claim 26, wherein the strands of each layer have a cross sectional area that is substantially different from the cross sectional area of the strands of all other layers.

43. The method of claim 26, wherein the mesh openings of each layer overlay portions of one or more mesh openings of the other layers.

44. The method of claim 26, wherein the mesh openings of each layer overlay one or more whole mesh openings of the other layers.

45. The method of claim 26, wherein said geogrid is not subjected to any substantial restraint other than that provided by said mass of particulate material.

46. The method of claim 26, wherein said mass of particulate material and geogrid together define a reinforced embankment, said geogrid is embedded in said mass of particulate material, and each layer of mesh structure is uniaxially oriented.

47. The method of claim 26, wherein said mass of particulate material and geogrid together define a reinforced embankment, said geogrid is embedded in said mass of particulate material, and each layer of mesh structure is biaxially oriented.

48. The method of claim 26, further comprising the step of embedding more than one, generally horizontally extending, layers of said geogrid in said mass of particulate material in a vertically spaced relationship to each other.

49. The method of claim 48, further comprising a face which extends generally at an angle to the horizontal with said mass of particulate material, wherein each said geogrid is embedded within said mass of particulate material such that a main part of each said geogrid extends generally horizontally to form one of said layers of said geogrid, and a further part of which, at about said face, extends horizontally as a next layer of said geogrid.

50. The method of claim 49, further comprising the steps of providing each said geogrid with an end part, and embedding each said geogrid in a mass of particulate material with said end part extending generally horizontally in spaced relationship to said main part and in juxtaposition to said next layer of said geogrid.

* * * * *